United States Patent
Parkinson

(10) Patent No.: US 8,819,891 B2
(45) Date of Patent: Sep. 2, 2014

(54) FLOOR INLET VALVE FOR A CENTRAL VACUUM CLEANING SYSTEM

(75) Inventor: Rick Alan Parkinson, Barrie (CA)

(73) Assignee: Canplas Industries Ltd., Barrie (CA)

( * ) Notice: Subject to any disclaimer, the term of this patent is extended or adjusted under 35 U.S.C. 154(b) by 659 days.

(21) Appl. No.: 13/047,508

(22) Filed: Mar. 14, 2011

(65) Prior Publication Data

US 2012/0228536 A1   Sep. 13, 2012

(30) Foreign Application Priority Data

Mar. 10, 2011   (CA) ..................................... 2733631

(51) Int. Cl.
*A47L 5/38* (2006.01)
*F16K 1/20* (2006.01)
*A47L 9/02* (2006.01)

(52) U.S. Cl.
CPC ................. *A47L 5/38* (2013.01); *F16K 1/2007* (2013.01); *A47L 9/02* (2013.01)
USPC ............... 15/301; 15/314; 454/270; 454/289; 454/330

(58) Field of Classification Search
USPC ......... 15/301, 314, 312.1; 200/61.6; 454/270, 454/284, 289, 330
IPC .......................................................... A47L 5/38
See application file for complete search history.

(56) References Cited

U.S. PATENT DOCUMENTS

| 6,108,858 A * | 8/2000 | Smith .............................. 15/314 |
| 2010/0095475 A1 * | 4/2010 | Gomes Melico et al. ........ 15/301 |

* cited by examiner

*Primary Examiner* — David Redding
(74) *Attorney, Agent, or Firm* — Hoffmann & Baron, LLP

(57) ABSTRACT

An inlet valve for a central vacuum cleaning system having a central vacuum motor connected to a piping network, is disclosed. The inlet valve includes a main body having an air inlet passageway formed therethrough and a pipe connector to connect the air inlet passageway of the inlet valve to the vacuum piping. An outer door is provided which is pivotally mounted to the main body on an opposite side to said connector and an inner door is provided which is pivotally mounted to said main body at one end between the outer door and the main body and seals the air inlet passageway when the inner door is in a closed position. A releasable latch is operatively connected to the outer door to keep the outer door and the inner door closed on the front of the valve when the inlet valve is not in use and a spring is provided to cause the inner door and the outer door to open upon the latch being released.

34 Claims, 11 Drawing Sheets

FLOOR INLET VALVE FOR A CENTRAL VACUUM CLEANING SYSTEM

CROSS-REFERENCE TO RELATED APPLICATION

This application claims priority to Canadian Patent Application No. 2,733,631, filed Mar. 10, 2011, the entire contents of which are hereby incorporated by reference.

FIELD OF THE INVENTION

This invention relates generally to central vacuum cleaning systems of the type that may be used to gather up dirt and debris from inside a building through a central suction motor and a network of vacuum suction pipes. More particularly, this invention relates to an inlet valve located on the vacuum piping to permit access to the suction within the piping. Most particularly, this invention relates to an inlet valve mounted on or adjacent to the floor of the type that may be used to remove dirt and debris gathered up to the device by sweeping or the like.

BACKGROUND OF THE INVENTION

Central vacuum cleaning systems are commonly used in modern home and commercial building construction. A central vacuum cleaning system typically includes a central vacuum motor, typically powered by electricity, which when activated creates a vacuum or suction. A connected network of rigid plastic pipes is located within the walls of the dwelling and in turn is connected to the central vacuum motor, the source of the vacuum. A removable debris collecting receptacle is provided as part of the central vacuum motor assembly. Accordingly, dirt and debris sucked into the pipe network is deposited in the removable receptacle which can be periodically emptied. The central vacuum motor is typically located in a remote location such as the basement or garage of a residential dwelling, where the noise of the vacuum motor is remote from the dwelling area, but the canister is still easily accessible for ease of emptying. The blowing action of the motor does not lift dust in the location being vacuumed as with a more conventional canister vacuum.

Wall mounted inlet valves are typically positioned on the vacuum piping network to permit flexible spiral wound hoses with rigid wand extensions to be connected to the source of vacuum. Typically, upon the hose cuff of the flexible hose being inserted into the inlet valve, a low voltage circuit is activated whereby the central vacuum motor is turned on. Some wands include an on/off switch to control the activation of the remote central vacuum motor. When the inlet valve is not in use a spring loaded cover or flap with a sealing gasket seals the opening in the inlet valve to prevent a loss of vacuum in the rest of the central vacuum system.

In addition to wall mounted inlet valves designed for hose attachment, more recently there have been developed floor or sweep inlet valves for directing the vacuum or suction adjacent to a floor surface. In this manner, debris swept up to the inlet valve can be removed through the vacuum inlet opening by the suction caused by the central vacuum motor.

One example of a prior floor type of inlet valve is Klassen, Canadian patent 2,104,484. This patent teaches a foot activated lever which when depressed by the user lifts a plug off of a downwardly directed vacuum pipe opening, closes a circuit to initiate suction and lifts a front gate on the device to create an inlet opening or passageway through which the dirt and debris can be drawn. However, this design is awkward because the user has to continually depress the lever, presumably with their foot, while at the same time trying to sweep around their foot to deliver the debris to the inlet opening and suction of the unit. If their foot is taken off of the lever this results in the door closing, the motor stopping and the plug sealing the rear opening of the device. While interesting this mode of operation is too awkward to be very practical.

Another prior device is Canadian Patent 2,123,179 to Graham. In this prior device a sweep inlet valve is provided also with a foot operated lever. However, rather than depressing the lever the user simply kicks the lever left or right. A double action spring acts to keep the lever positioned in one or the other positions. One position corresponds to an open and activated vacuum inlet, and the other position corresponds to a closed vacuum inlet with the motor turned off. This is a more practical approach than Klassen, but in Graham the front of the vacuum inlet is always open and the vacuum seal is only formed at the rear of the unit. Therefore, when installed in a floor trim or in a toe rail under a cabinet or the like the front opening is visible and can become caked with dirt, dust or the like, creating an unsightly appearance. In any event a permanently open front is not the most desirable look.

A further prior inlet valve is to Mantyla, Canadian patent 2,279,770. In this prior patent a valve cover plate or door is provided on the front of the unit which is held in sealing engagement to the main body by an arched latch mechanism. In this way the unit is always closed when not in use and provides an improved aesthetic appearance. By lifting the latch with their toe, the user frees the door which is biased to an open position to provide access to the vacuum source. The opening of the door also closes a low voltage circuit to activate the central vacuum motor. However, this prior design includes an arched latch mechanism which stands proud of the surface of the unit to considerable degree. Therefore, it projects slightly out from the baseboard somewhat which in some cases may be considered undesirable.

Other floor or other types of inlet valves are shown in the following additional U.S. Pat. Nos. 2,810,028, 3,027,587, 3,027,588, 3,655,927, 3,676,986, 5,083,704, 5,205,013, 5,279,016, 5,408,721, 5,504,967, 6,108,858 and Canadian patent 2105554.

What is desired is a floor or sweep inlet valve for connection to a central vacuum system that overcomes one or more of the deficiencies of these prior designs.

SUMMARY OF THE INVENTION

The present invention is directed to a sweep inlet valve which is of a sleek outer design and does not project as obtrusively from the floor surface or wall surface in which it is mounted as the prior art. The present invention is also directed to a design which completely covers the vacuum opening when not in use presenting a clean, finished appearance with surface texturing if desired, rather than leaving a gaping hole or permanent opening as in some of the prior art. The present design is also one which is easily turned on or off by a single contact by the foot of the user without the need for continuous contact with the unit in order to maintain power, the vacuum opening, or any other aspect required to operate the unit.

In particular, this invention is directed to an inlet valve for a central vacuum cleaning system having a central vacuum motor connected to a piping network, the inlet valve comprising:

a main body having an air inlet passageway formed therethrough and an outlet connector to connect the inlet valve to said vacuum piping;

an outer door pivotally mounted to said main body over an inlet side of said air inlet passageway on an opposite side of said main body from said outlet connector;

an inner door pivotally mounted to said main body, said inner door being positioned between said outer door and said main body and covering an inlet side of said air inlet passageway when in a closed position, said inner door being mounted to said outer door wherein said inner and outer doors pivot open and closed together;

a releasable latch operatively connected to said outer door to keep said outer door closed and said inner door on an inlet side of said air inlet passageway when said unit is not in use; and a spring to cause said inner door and said outer door to open upon said latch being released.

BRIEF DESCRIPTION OF THE DRAWINGS

Reference will now be made, by way of example only, to drawings in which depict preferred embodiments of the present invention and in which.

DETAILED DESCRIPTION OF THE PREFERRED EMBODIMENTS

Figure 1:
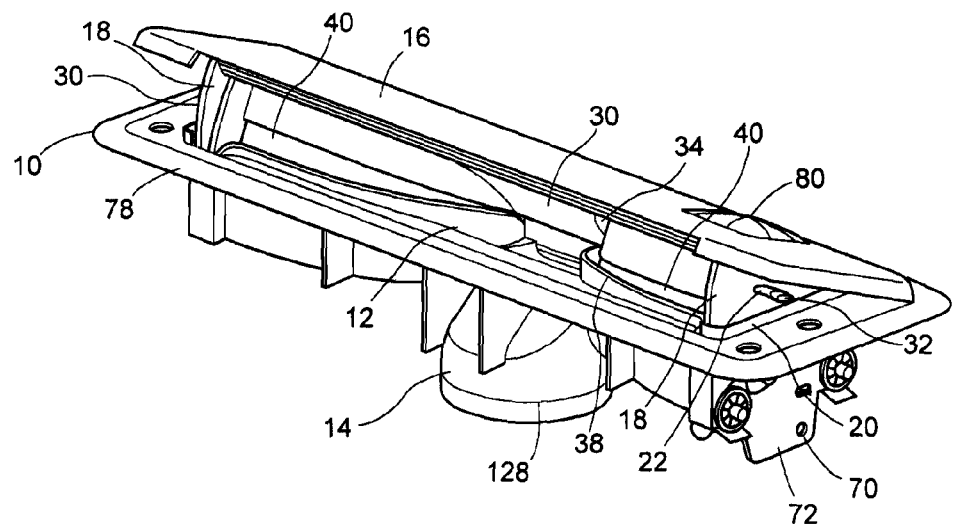
FIG. 1 is a perspective view of the present invention from below and to one side in a doors open position.

FIG. 1 shows an inlet valve for a central vacuum cleaning system according to the present invention. The inlet valve includes a main body 10 with an air inlet passageway 12 ending in an outlet spigot pipe connection 14 on a rear face of the main body 10. The main body defines an air passageway through the main body as shown. An outer door 16 is hinged along a top edge of the main body 10 to permit the outer door 16 to pivot between an open and a closed position and includes door spline walls 18 at each side edge. These door spline walls 18 slide through an opening between low debris walls 20 in the main body as the outer door opens and closes. The door spline walls 18 help to define a front opening on the air passageway through the main body to, among other things, more precisely focus the suction. A cam opening 22 is formed in each door spline wall 18. A button latch assembly 24 is mounted to the outer door 16 and accessible through an opening 26. The button latch assembly 24 interacts with a latch mechanism 28 on the main body 10.

Also shown is an inner door 30. The inner door 30 includes a cam follower 32 at each side edge which fits into the cam openings 22 in the door spline walls 18 of the outer door 16. The inner door 30 also includes a flat gasket 34 to seal against the main body 10. Most preferably the flat gasket 34 is an overmolded gasket which is secured in openings (not shown) within the inner door 30 such that the flat gasket 34 projects on both the outside and the inside of the inner door 30. The outside face of the flat gasket is herein indicated with number 36. Most preferable the flat gasket 34 provides a sealing surface to seal against a sealing edge 38 on the main body 10 when the inlet valve is not in use but there is suction in the system because some other outlet is in use. The inner door 30 also carries a contour molded gasket 40 to seal the air passageway through the body when the inlet valve is in use to prevent a loss of vacuum around the inner door 30. The operation of these elements will be explained in more detail below. The inner door 30 is pivotally hinged to the main body 10 in a manner described in more detail below.

Figure 2:
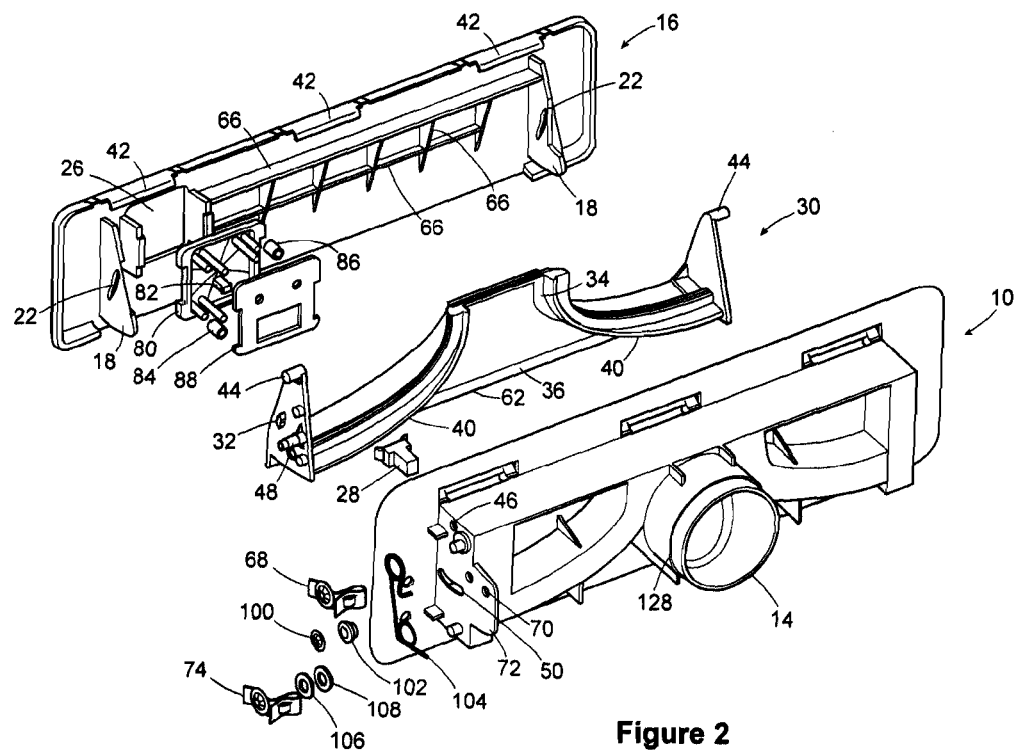
FIG. 2 is a rear exploded view of the embodiment of FIG. 1.

Turning now to FIG. 2, the outer door 16 has outer door hinges 42 by which it can be hingedly mounted to the main body 10. The inner door 30 is mounted to the main body 10 by means of inner door pivot points 44, which define an inner door hinge axis. Inner door pivot points 44 are mounted into holes 46 in the main body 10. As well inner door spring cam shafts 48 fit into curved slots 50 on the main body 10. The inner door 30 is provided with door guide pads 52 (see FIG. 5) located on an outer face 54 of the inner door 30 to ensure that the outer door 16 slides smoothly and without catching across the inner door 30 when the doors are being opened or closed. The cam followers 32 of the inner door 30 fit into the cam openings 22 of the door splines 18 of the outer door 16. The action of the cam followers 32 is described in more detail below.

Figure 3:
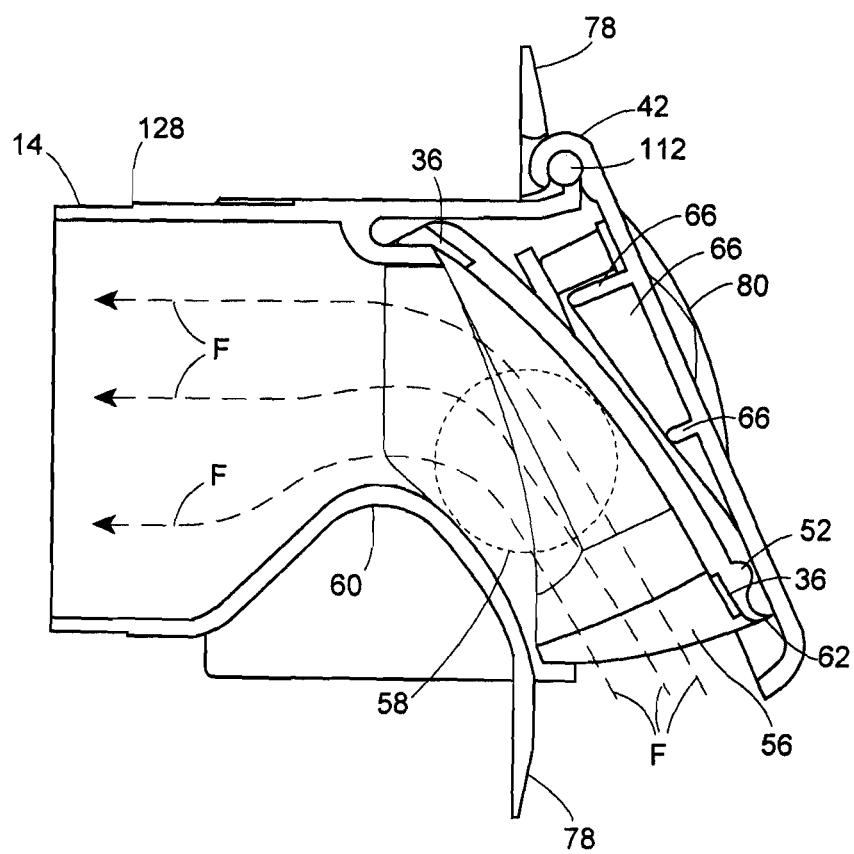
FIG. 3 is a true cross-section view of the embodiment of FIG. 1 along lines 3-3.

As shown in FIG. 3, when the inner and outer doors are opened, they help define an air suction mouth area 56 which leads to a throat area 58 defined over an air foil 60. As can be seen by the air flow lines F the air flow, created by the suction of the central vacuum motor, is caused to accelerate through the throat area 58 to help lift dirt and debris over the air foil 60. The air suction area 56 is defined by the inner door lower edge 62, the outer door splines 18, and the floor 64.

Figure 4:
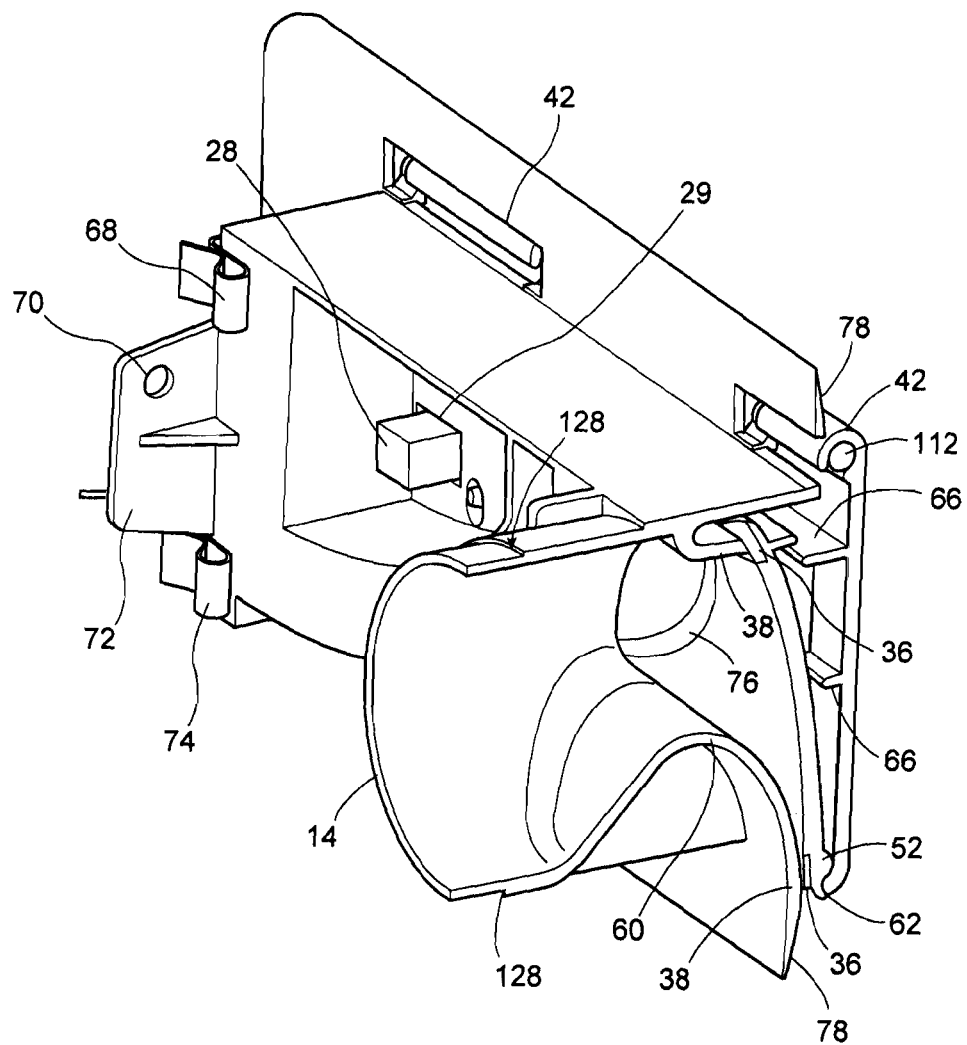
FIG. 4 is a cross-sectional perspective view of the embodiments of FIGS. 1 and 2 in a doors closed position.

FIG. 4 shows a view from behind of the preferred form of the invention of FIGS. 1 and 2. In FIG. 4 strengthening ribs 66, which may be placed in a grid pattern, can be seen on the outer door 16. As will be appreciated by those skilled in the art, the strengthening ribs 66 provide a rigid plastic door with a lower total amount of plastic than a solid door. Therefore the strengthening ribs 66 are useful for stiffening the door without requiring large additional amounts of plastic and provides a material and cost saving feature for the present invention. It will also be appreciated that other rib patterns (honeycomb) are comprehended by the present invention. It will also be appreciated that as the inner door 30 is making the sealing connection with the inlet opening of the main body 10, the outer door 16 can have a more relaxed dimensional tolerance than the inner door 30.

A spring assembly is used to bias the inner and outer doors to an open position. As shown, there are provided the following support elements to complete the spring assembly. On the main body 10 there is provided a top wire terminal 68 and a cable trap hole 70. The guide wall 72 of the main body 10 helps to hold the spring (not shown) in place. A lower wire terminal 74 is provided as well.

FIG. 4 also shows, in more detail, the air foil 60. The throat area 58 is defined by curved walls 76 and the air foil 60. The purpose of the curved walls 76 is to focus the suction in a region close to the floor next to the sweep inlet valve to encourage the removal of dirt, debris and the like that are swept up to the unit. The air foil 60 helps to encourage efficient removal of debris and sweepings by means of its shape. As well, the outer door hinge 42 is clearly illustrated in FIG. 4. Also shown is the front debris ramp 78 on the main body 10. A slight incline has been found to provide good results, with the range being between 5 and 20 degrees. The most preferred incline is an 11 degree incline for this embodiment.

Figure 5:
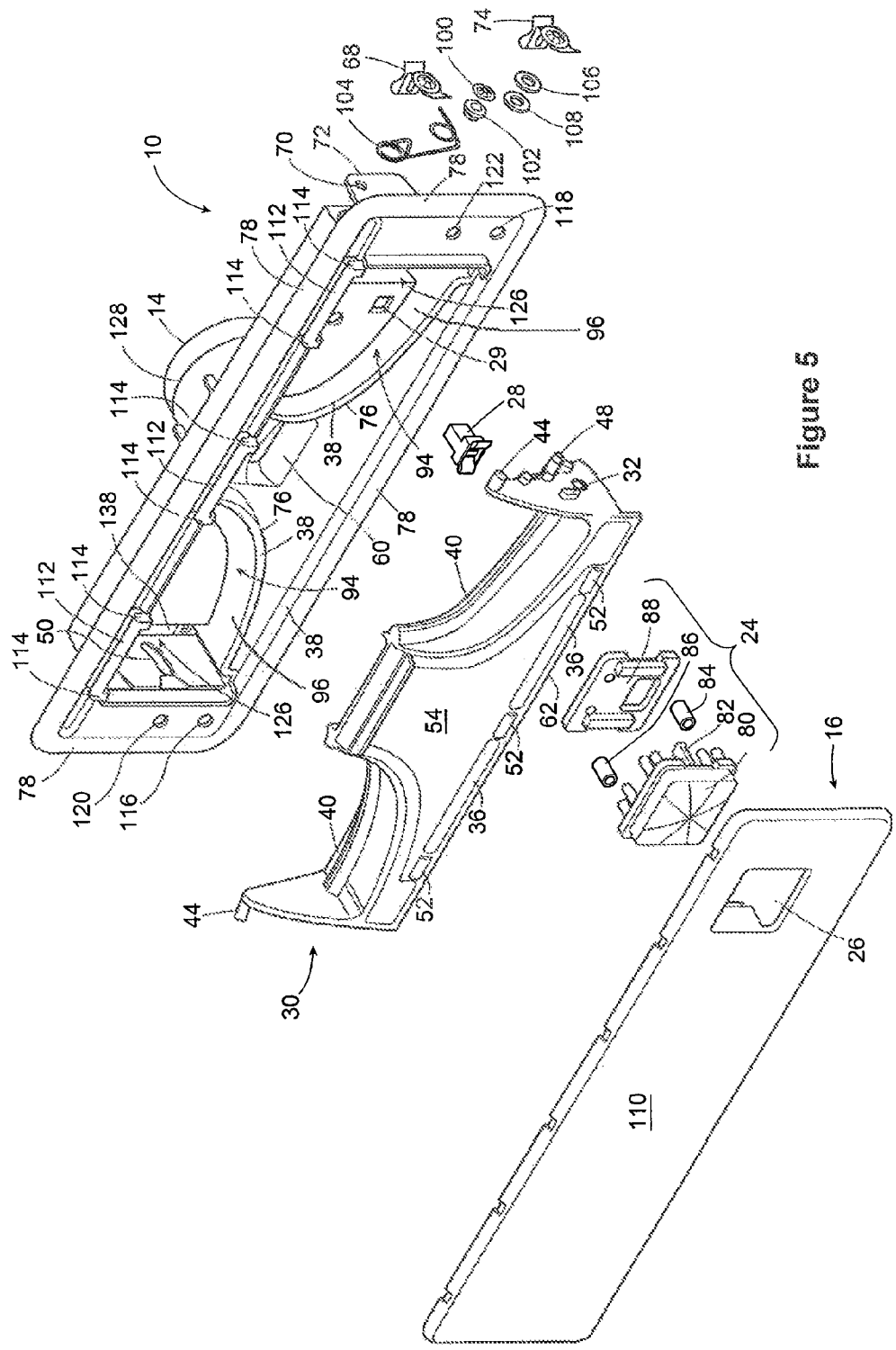
FIG. 5 is an exploded view of the present invention from above and in front.

FIG. 5 discloses the button latch assembly 24 and latch mechanism 28 in exploded view. The button latch assembly 24 is mounted to the outer door 16 and includes a button 80, with a latch striker 82, two button springs 84 and 86, a retainer plate 88. The latch mechanism 28 is mounted in hole 29 in the main body 10. The button latch assembly 24 and latch mechanism 28 interact in a known manner to permit the outer door 16 to be held in a closed position, when the latch mechanism 28 holds the latch striker 82 of the button 80. When the button 80 of the button latch assembly 24 is depressed against the button springs 84, 86 the latch mechanism 28 releases the latch striker 82 to permit the outer door 16 to spring open to an open position. The back of the latch assembly 28 is best seen in FIG. 4. It will be appreciated that more or fewer button springs are comprehended by the present invention. The main body 10 is also shown with the inner door 30 and the outer door 16 in exploded view. The outer face 36 of the flat gasket 34 is shown on the inner door 30 to provide reasonable seal between the inner and outer door. This seal is to discourage dirt from getting into the space between the inner and outer doors and potentially disrupting the smooth functioning of the device, while a good seal is desirable it does not need to be airtight. In fact there are breaks in the seal to provide the door guide pads 52 previously described. Also shown are the inner door 30 pivot points 44 and the cam follower 32.

FIG. 5 shows the outer door 16 with an opening 26 for the button latch assembly 24. Also shown are the curved walls 76 in the main body 10 which direct the dirt and debris along a specific narrow flow path towards the open throat area 58 defined by the air foil 60 as previously discussed. From the rear (best seen in FIG. 2) it can be seen that the curved walls 76 form a gasket channel or slot 94 which extends in a curved manner from the lower outer corners towards the upper middle. The gasket channel 94 is preferably provided with a rounded lower edge 96 to permit a sliding seal to be made thereagainst. This gasket channel or slot 94 in the front face of the main body 10 accommodates the contour molded gasket 40. This contour molded gasket 40 is intended to prevent a loss of suction to behind the inner door 30 and so needs to be able to maintain a seal when the inner door 30 is in the fully open position. Essentially this contour molded gasket 40 is curved in shape to match the shape of the gasket channel 94 and follows along the contoured sealing edge 38 of the channel 94 of the main body 10 during the rotation of the inner door from the closed to the open position and vice versa. The contour molded gasket 40 is most preferably provided with a face seal to permit better sealing contact with the main body 10 in the open position.

As shown on the right hand side of the main body 10, there is provided wire terminals or contacts 68 and 74. Most preferable the wire terminals 68, 74 are of the spring loaded type so that wire connections can be easily made to the low voltage wires (not shown) without the need for tools or the like. A push nut 100 is provided to hold a plastic grommet 102 in place on the inner door spring cam shaft 48, when it is located within a curved slot 50 on the main body 10 (see FIG. 2). A door spring 104 is shown with spacer washers 106, 108. The spacer washers are preferably electrically conductive and increase the electrical contact area for better reliability. The door spring 104 is held in place and exerts an opening bias on the outer door via the inner door spring cam shaft 48. The door spring 104 acts on the inner door/outer door combination to cause the doors to open. When the latch striker 82 of the button 80 is held by the latch mechanism 28 the outer door 16 cannot move. When the latch striker 82 is released from the latch mechanism 28 the button latch assembly 24 and thus the outer door 16 to which it is mounted are freed and the door spring 104 causes the doors 16, 30 to open. As the cam followers 32 of the inner door 30 move along the cam openings 22, the outer door 16 opens. As the door spring 104 opens the inner and outer doors, the position of the door spring 104 changes relative to the wire terminals 68, 74 and then, when the doors 16, 30 are open the door spring 104 closes the electrical contact by contacting the spacer washers 106, 108, completing the low voltage circuit, to initiate the central vacuum motor and creating suction. It will be understood by those skilled in the art that the door spring 104 can be exerting force on the inner door 30, the outer door 16 or both depending upon the configuration of the elements. However, good results have been obtained where the door spring 104 acts on the inner door spring cam shafts 48 of the inner door 30 and the outer door 16 is moved Open as the inner door 30 opens.

Figure 6:
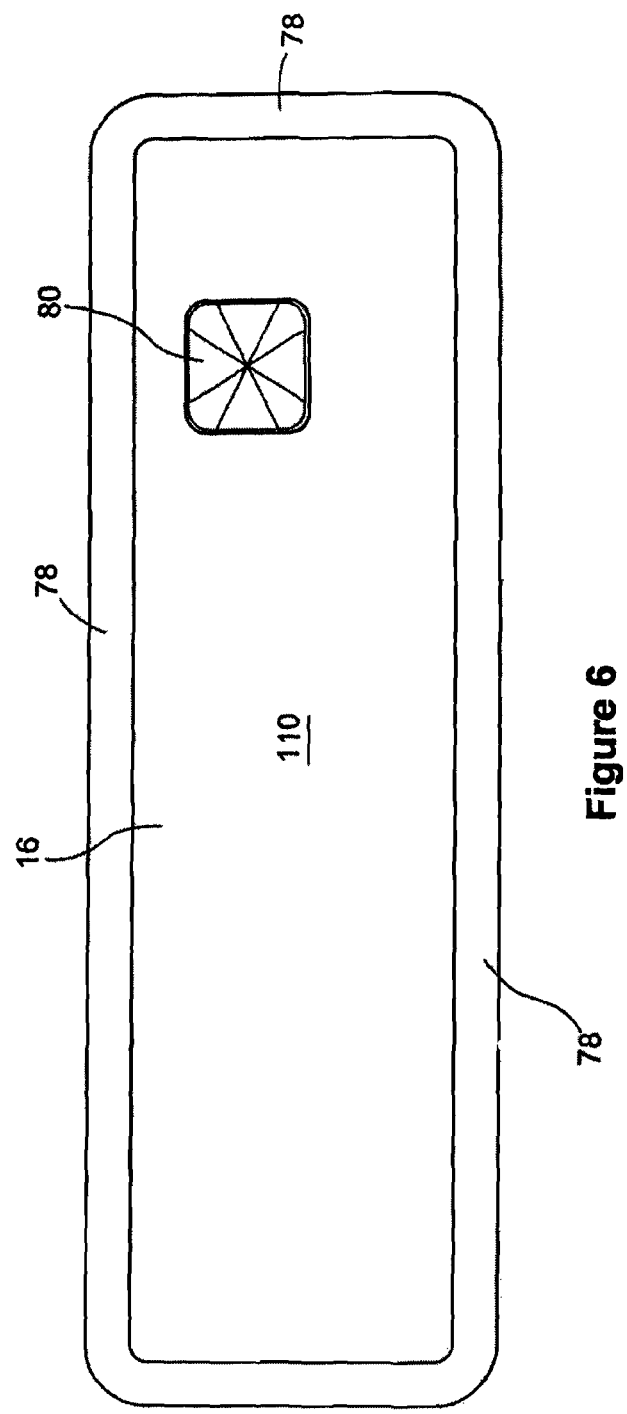
FIG. 6 is a front view of FIG. 4.

The present invention is also directed to a design which completely covers the vacuum opening when not in use presenting a clean, finished appearance In FIG. 6 the outer face 110 of the outer door 16 is shown with the button 80. As can be appreciated, the outer face 110 of the present invention presents a clean, finished appearance. As shown, the outer face 110 presents a smooth cover or exterior (which may be textured if desired) that will blend easily into wall boards or the like without leaving a gaping opening as in some of the prior art. Further while the button 80 is slightly proud of the front surface it can be gently curved or rounded to provide an easy to activate element (best seen in FIG. 1).

Figure 7:
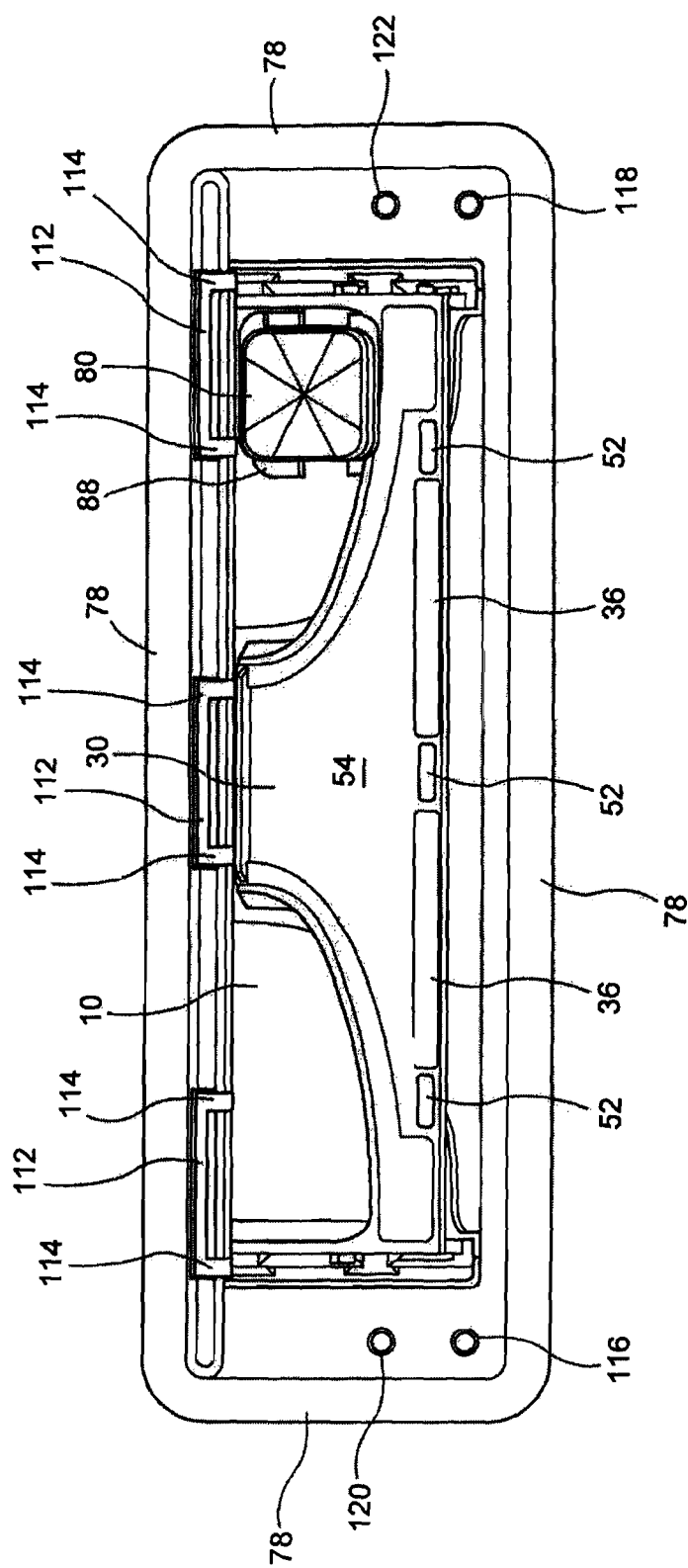
FIG. 7 is a front view of the embodiment of FIG. 1 with the outer door removed.

FIG. 7 shows a further view of the present invention with the outer door 16 removed for ease of illustration. In this view, the outer door hinge pins 112 are shown running across the top of the main body 10 for coupling the outer door hinge 42. The outer door hinge pins 112 are mounted between pairs of hinge pin support columns 114. The outer door hinge pins 112, outer door hinges 42, and hinge pin support columns 114 form hinge assemblies. It will also be appreciated that each hinge assembly is in the nature of a snap fit coupling of the outer door hinge 42 onto the outer door hinge pin 112 on the main body 10. In this way the outer door 16 can be removed from the main body 10 for ease of installation or service of the device in a base board or toe rail or the like (not shown). In FIG. 7 the mounting screw holes 116 and 118 for the main body 10 are clearly shown and well exposed when the outer door 16 is removed for ease of access. A second set of holes 120, 122 can also be provided. Most preferably, the outer door 16 will be disengaged from the inner door 30 in the shipped form of the invention. The installer simply removes the device from the package, positions the unit on the mounting surface, connects the vacuum piping, and screws the main body 10 in place. Afterwards, the outer door 16 can be pressed closed, and there is enough play in the components to allow the cam followers 32 to press past the edge of the door spline walls 18 until they engage in the cam openings 22. This is achieved by gently pressing the outer door 16 down onto the inner door 30. In this way installation is quickly and easily completed.

As well, FIG. 7 shows the width of the suction opening or chute opening 124. Also shown are lower debris walls 20 which are low walls adjacent to the slots 126 through the main body 10 which house the door spline walls 18 of the outer door 16. The debris lower debris walls 20 are simply to make it less likely that debris will become jammed into the slots 126 affecting smooth opening and closing of the inner and outer doors 30, 16.

The connection of the invention to the vacuum piping is established in a conventional manner by placing a vacuum piping connector over the outlet spigot pipe connector 14 which is dimensioned to make a snug fit. Glue can be used if desired to complete the joint. In some installations there may be less room behind the invention to establish the connection to the vacuum piping. The present invention provides a short cut line 128 (see FIG. 1) molded into the outlet spigot pipe connector 14. The short cut line 128 can be used by the installer to reduce the length of the outlet pipe spigot connector 14 to reduce the depth of the invention to accommodate smaller installation spaces.

The operation of the present invention can now be more clearly understood. When the outer door 16 is in a closed position it is held in the closed position by means of the interaction between the button latch assembly 24 and the latch mechanism 28. The flat gasket 34 is in contact with the edge of the main body 10 to maintain a seal all the way along the upper edge. The front 36 of the lower part of the flat gasket 34 on the inner door 30 seals a lower edge of the front of the vacuum opening. A user, who wishes to open the inlet valve of the present invention, simply taps the button 80 with their toe, causing the latch mechanism 28 to release the latch striker 82 thereby allowing the outer door 16 to spring open under the influence of door spring 104. It will be appreciated that the door spring 104 continuously urges the doors 16, 30 into an open position, but is frustrated when the interaction of the button latch assembly 24 with the latch mechanism 28 latches the outer door 16 in a closed position. In other words, upon release of the button latch assembly 24 from the latch mechanism 28, the outer door 16 is allowed to move to an open position by means of the door spring 104 acting on inner door spring cam shaft 48 on the inner door 30.

Figure 8A:
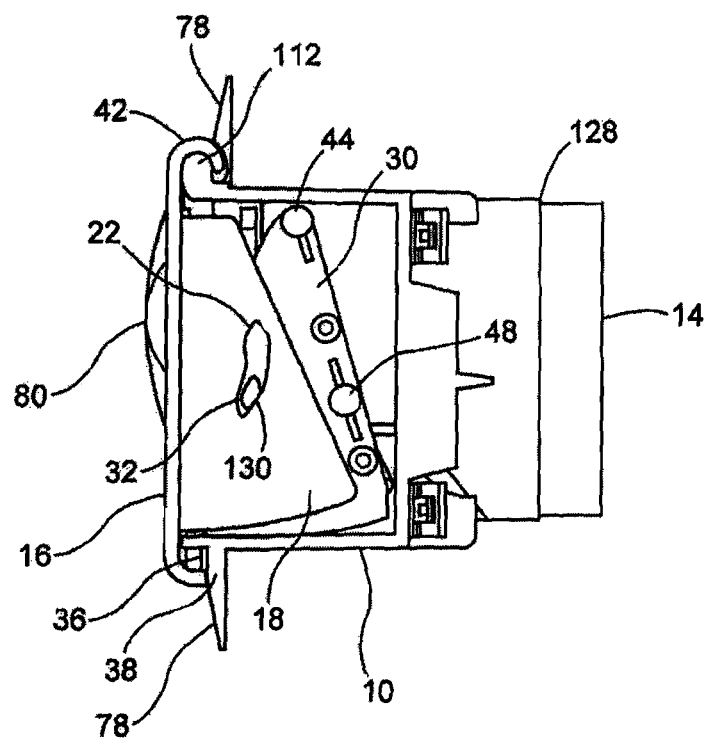
FIG. 8a is a side cross-sectional view showing the outer door cam slot in more detail in a doors closed position.
Figure 8B:
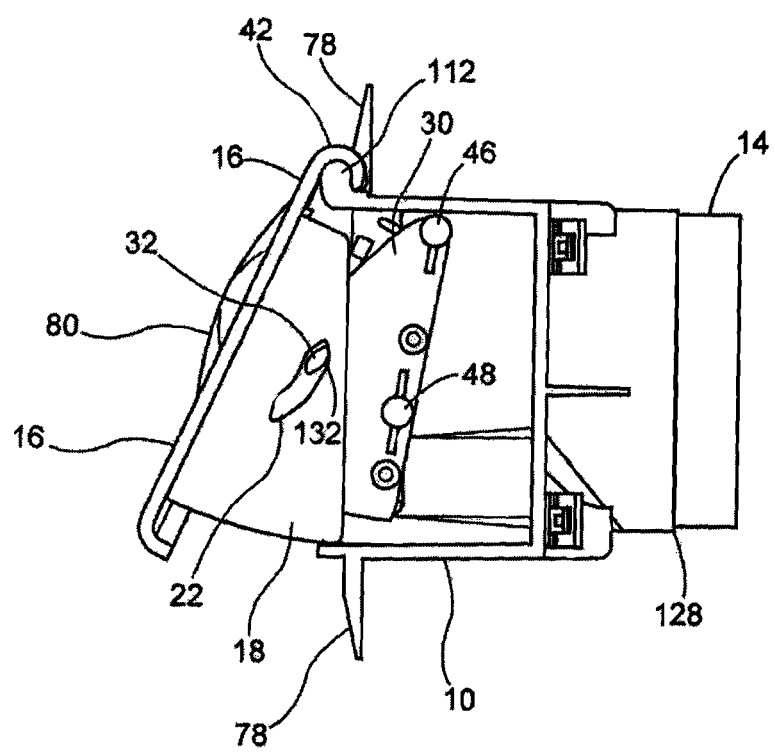
FIG. 8b is the view of 8a in a doors open position.

As shown in FIG. 8a when the doors are closed the cam follower 32 is located at a lower end of the cam opening 22. As shown the cam follower 32 is in the form of a shaped post, with a lower outer curved surface that fits against the curved cam opening 22 at position 130. As shown in FIG. 8b, with the doors open the cam follower 32 is now located towards the other end of the cam opening 22 at position 132. The shape of the cam opening 22 is due to the inner door hinge axis being displaced from the outer door hinge axis. This results in a need to have the cam follower 32 move along an arc, relative to the outer door 16, requiring the cam opening 22 to have a curved shape.

As the inner door 30 is urged outwardly, the outer door 16 is also pivoted about its hinge points and opens the air suction area 56 of the inlet valve. As the inner door 30 pivots open the flexible contour molded gasket 40 moves within the gasket channel 94 allowing the inner door 30 to change position without binding during opening and closing. In this way, when opened, the contour molded gasket 40 seals on sealing edges 38 and the sweepings are directed only through the throat of the unit and not into any other spaces. As the door spring 104 moves to the open door position, it closes a low voltage circuit between the wire terminals 68, 74 initiating the vacuum motor and suction through the main body 10. As will now be appreciated, the main body 10 includes curved walls 76 which feed to a throat area 58 defined by an air foil 60. As a result, the suction is directed, concentrated and the air flow maintained at an optimum speed to help the present invention achieve superior suction and hence removal of the debris located within the general area of the air suction area 56 of the inlet valve.

When the debris swept up to the unit has been sucked away, the user can simply push on the button 80 with their toe to cause the outer door 16 to close. This will close the inner door 30, load up the door spring 104 and disengage the door spring 104 from the wire terminals 68, 74 causing the central vacuum motor to shut down. As the outer door 16 reaches the fully closed position the latch mechanism 28 will again engage and hold the doors 16, 30 in a closed position against the biasing force of the now reloaded door spring 104. In some cases the inner door 30 might not be held closed onto the main body 10, due to design tolerances of the plastic molded parts. However, even so the inner door 30 is able to retain suction because the activation of suction in the system, for example when another inlet valve is in use, will cause the inner door 30 to be sucked onto the sealing edges 38 of the main body 10 creating a tight seal and preventing a loss of suction. While the foregoing mode of latching and unlatching of the doors is the most preferred form of the invention, the present invention also comprehends that an electronic switch such as a solenoid or RF activated remote controlled switch, or even a buttonless door latch, can be used in place of the button latch assembly 24 and latch mechanism 28 discussed above.

Figure 9:
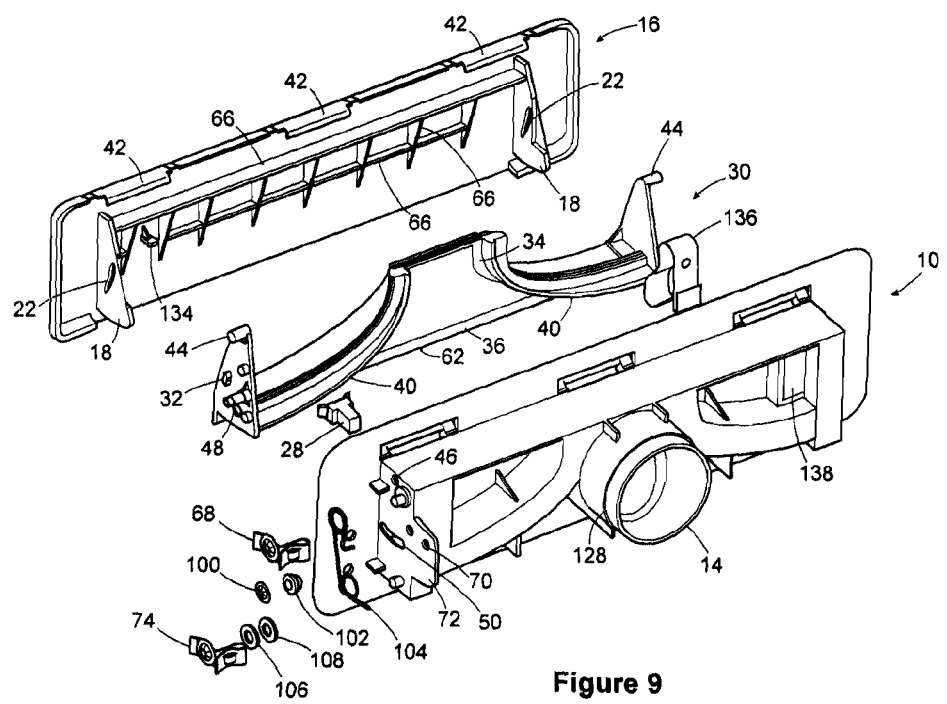
FIG. 9 is an exploded rear view of a second embodiment of the present invention having a touch operated outer door.
Figure 10:
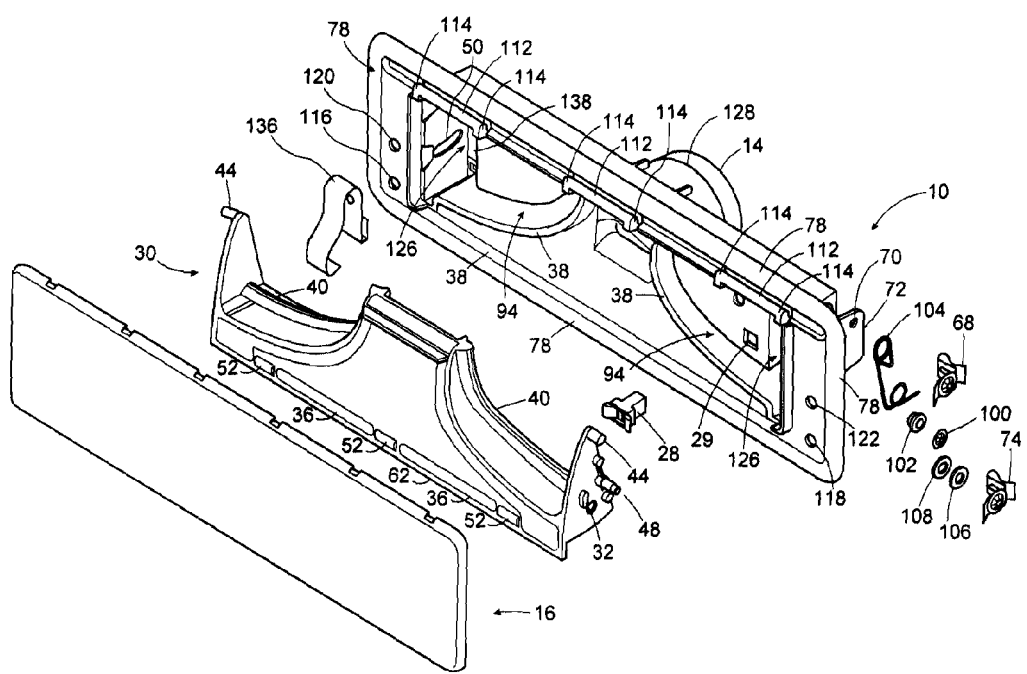
FIG. 10 is an exploded front view of the second embodiment of FIG. 9.

A buttonless alternative embodiment of the present invention is shown in FIGS. 9 and 10. In this embodiment the whole door acts as the button, and so no separate button is required. In FIGS. 9 and 10 like elements from the first embodiment are shown with like numbers. In this embodiment the latch striker 134 extends rearwardly from the outer door 16 as shown. To achieve a balance of forces on the doors, a passive flat spring 136 is mounted in a recess 138 and contacts the outer door 16 in a generally symmetrically disposed position to said latch striker 134. The flat spring 136 is sized and shaped to allow the forces along the outer door to be evenly balanced to permit smooth operation of the doors. In this embodiment, a user simply taps on the door, in any location, to cause the latch striker 134 to be released from the latch mechanism 28. Once released this embodiment functions the same as previously described, with the door spring 104 opening the device. To close the outer door 16, the user simply presses on the outer door 16 in any location to cause the outer door 16 to close and the latch striker 134 to be captured by the latch mechanism 28. Although it would be preferable to position the latch striker 134 in the middle of the door 16, the air inlet passage way 12 and inner door 30 are in the way. Therefore, the present invention provides a latch striker 134/latch mechanism 28 on one side of the unit, with the flat spring 136 on the other side.

As can now be appreciated the present invention provides a sleek unit, able to fit into small installation spaces and yet which provides a wide suction mouth area. Without limiting the invention to these dimensions, a preferred form of the unit is 299.7 mm long by 91.4 mm tall by 69 mm thick. The air suction area 56 is 216 mm wide at the floor 64. It will also be appreciated that the present invention can be installed in a wall, or in a floor although the latter is believed less preferred as it creates a potential tripping hazard when the unit is open and in use.

It will be appreciated that the foregoing description is in respect of certain preferred embodiments of the present invention, but that other configurations are comprehended within the broad ambit of the appended claims. Some of these alterations and variations are discussed above and others will be apparent to those skilled in the art. For example, although in the preferred embodiment the door spring 104 acts on the outer door 16, this is not essential. All that is required is for the inner and outer doors to be motivated by the door spring 104 so that when released the doors open, the electrical circuit is completed and the vacuum motor can start.

The embodiments of the invention in which an exclusive property or privilege is claimed are defined as follows:

1. An inlet valve for a central vacuum cleaning system having a central vacuum motor connected to a piping network, the inlet valve comprising:
   a main body having an air inlet passageway formed therethrough and an outlet connector to connect the inlet valve to said vacuum piping;
   an outer door pivotally mounted to said main body over an inlet side of said air inlet passageway on an opposite side of said main body from said outlet connector;
   an inner door pivotally mounted to said main body, said inner door being positioned between said outer door and said main body and covering an inlet side of said inlet passageway when in a closed position, said inner door being mounted to said outer door wherein said inner and outer doors pivot open and closed together;
   a releasable latch operatively connected to said outer door to keep said outer door closed and said inner door on an inlet side of said air inlet passageway when said inlet valve is not in use; and
   a spring to cause said inner door and said outer door to open upon said latch being released;
   wherein said inner door has a pivot axis displaced from a pivot axis of said outer door.

2. The inlet valve as claimed in claim 1, wherein said releasable latch comprises one of a latch striker and said latch mechanism attached to said main body and the other of said latch striker and said latch mechanism attached to said outer door, said latch mechanism being adapted to selectively retain or release said latch striker.

3. The inlet valve as claimed in claim 2, further comprising a button attached to said outer door, and said latch striker or said latch mechanism being attached to said button.

4. The inlet valve as claimed in claim 1, wherein said air inlet passageway includes an air foil to accelerate air flow through said air inlet passageway.

5. The inlet valve as claimed in claim 1, wherein said inner door includes a flexible seal mounted between said inner door and said main body to seal said inner door to said main body.

6. The inlet valve as claimed in claim 5, wherein said inner door includes at least one door guide pad extending between said inner door and said outer door.

7. The inlet valve as claimed in claim 5, wherein said inner door includes side walls which extend between said inner door and said main body when said inner door is in an open position.

8. The inlet valve as claimed in claim 1, wherein said inner door is mounted to said outer door and said inner door and said outer door open and close together.

9. The inlet valve as claimed in claim 8, wherein said spring acts on said inner door and said inner door includes at least one cam follower mounted in a cam following slot on said outer door to cause said outer door to open.

10. The inlet valve as claimed in claim 9, wherein said outer door includes opposed debris containing walls which extend through slots on said main body.

11. The inlet valve as claimed in claim 10, wherein said at least one cam following slot is formed in at least one of said debris containing walls.

12. The inlet valve as claimed in claim 11, wherein said main body further includes a curved slot to guide said post as said inner and outer doors open and close.

13. The inlet valve as claimed in claim 10, further including a post against which said spring acts to bias open said outer door, said post being located in said cam following slot in said at least one of said debris containing walls.

14. The inlet valve as claimed in claim 1, wherein said inner door carries a flexible gasket to prevent a loss of suction around a top edge of said inner door.

15. The inlet valve as claimed in claim 14, wherein said main body includes a gasket channel to accommodate said flexible gasket as said inner door opens and closes.

16. The inlet valve as claimed in claim 2, further comprising a switch to initiate an associated central vacuum when the inner door and said outer door are open.

17. The inlet valve as claimed in claim 16, wherein said switch comprises a spring and a vacuum motor initiation circuit, wherein said spring is conductive and when said spring has opened said inner and outer doors and spring closes said vacuum motor initiation circuit.

18. The inlet valve as claimed in claim 17, wherein said spring is mounted on an outside of said main body adjacent to a pair of wire terminals.

19. The inlet valve as claimed in claim 1, wherein said air passageway is defined in part by curved walls to help focus said suction onto sweepings positioned adjacent to said inlet valve.

20. The inlet valve as claimed in claim 4, wherein said air foil comprises a smoothly curved surface which narrows said air inlet passageway through said main body to accelerate air flow therethrough.

21. The inlet valve as claimed in claim 1, wherein said inner door includes a flat gasket, located around an edge of said inner door to seal against a sealing edge of said main body.

22. The inlet valve as claimed in claim 21, wherein said flat gasket is overmolded onto said inner door.

23. The inlet valve as claimed in claim 1, wherein said releasable latch further comprises a moveable latch striker associated with a button on an outside of said outer door and a latch mechanism fixed to said body.

24. The inlet valve as claimed in claim 23, wherein said button is sized and shaped to be actuated by a toe of a user.

25. The inlet valve as claimed in claim 23, further including springs in said releasable latch to bias said latch striker to a catch position.

26. The inlet valve as claimed in claim 25, wherein when said button is actuated said springs are biased to a release position.

27. The inlet valve of claim 23, wherein the releasable latch is configured to be unlatched by operation of said button, but may be latched by pressing on the outer door remote from said button.

28. The inlet valve of claim 1, wherein said releasable latch is positioned closer to one side edge of said outer door and a further spring is positioned behind said outer door closer to an opposite side edge of said outer door.

29. The inlet valve as claimed in claim 28, wherein said spring is in the form of a flat spring.

30. The inlet valve as claimed in claim 1, wherein the inner door includes a curved wall.

31. The inlet valve as claimed in claim 1, wherein the inner door includes a curved edge.

32. The inlet valve as claimed in claim 1, wherein the inner door includes an inner wall with a curved flexible seal thereon.

33. The inlet valve as claimed in claim 1, wherein the inner door includes guide pads located on an outer face of the inner door.

34. An inlet valve for a central vacuum cleaning system having a central vacuum motor connected to a piping network, the inlet valve comprising:

a main body having an air inlet passageway formed therethrough and an outlet connector to connect the inlet valve to said vacuum piping;

an outer door pivotally mounted to said main body over an inlet side of said air inlet passageway on an opposite side of said main body from said outlet connector;

an inner door pivotally mounted to said main body, said inner door being positioned between said outer door and said main body and covering an inlet side of said inlet passageway when in a closed position, said inner door being mounted to said outer door wherein said inner and outer doors pivot open and closed together;

a releasable latch operatively connected to said outer door to keep said outer door closed and said inner door on an inlet side of said air inlet passageway when said inlet valve is not in use; and a spring to cause said inner door and said outer door to open upon said latch being released;

wherein the inner door includes an inner wall with a curved flexible seal thereon.

* * * * *